(12) United States Patent
Lee

(10) Patent No.: US 11,505,044 B2
(45) Date of Patent: Nov. 22, 2022

(54) STRUCTURE FOR SHIELDING RAIL EXPOSED TO OUTSIDE OF SLIDING DOOR VEHICLE

(71) Applicants: Hyundai Motor Company, Seoul (KR); Kia Motors Corporation, Seoul (KR)

(72) Inventor: Jae-Seung Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 274 days.

(21) Appl. No.: 17/065,942

(22) Filed: Oct. 8, 2020

(65) Prior Publication Data

US 2022/0009325 A1 Jan. 13, 2022

(30) Foreign Application Priority Data

Jul. 10, 2020 (KR) .................... 10-2020-0085414

(51) Int. Cl.
*B60J 5/04* (2006.01)
*B60J 5/06* (2006.01)
*E05F 15/00* (2015.01)
*E05D 15/06* (2006.01)

(52) U.S. Cl.
CPC ............. *B60J 5/0493* (2013.01); *B60J 5/06* (2013.01); *E05F 15/00* (2013.01); *E05D 15/06* (2013.01); *E05Y 2201/684* (2013.01); *E05Y 2900/531* (2013.01)

(58) Field of Classification Search
CPC . B60J 5/0493; B60J 5/06; B60J 5/0418; B60J 5/0468; B60J 5/047; E05F 15/00; E05D 15/06; E05D 15/101; E05Y 2201/684; E05Y 2900/531; E05Y 2800/40; B62D 25/025; B60Y 2304/078
USPC ...................................... 296/209, 146.9, 147
See application file for complete search history.

(56) References Cited

U.S. PATENT DOCUMENTS

| | | | |
|---|---|---|---|
| 10,363,968 B2 * | 7/2019 | Nusier | B60J 5/0479 |
| 10,807,657 B2 * | 10/2020 | Povinelli | B62D 37/02 |
| 10,899,392 B2 * | 1/2021 | Min | B62D 27/02 |
| 11,414,140 B2 * | 8/2022 | Povinelli | B62D 37/02 |
| 2020/0223490 A1 * | 7/2020 | Min | B62D 27/02 |

FOREIGN PATENT DOCUMENTS

KR 19970021619 U 6/1997

* cited by examiner

*Primary Examiner* — Pinel E Romain
(74) *Attorney, Agent, or Firm* — Slater Matsil, LLP

(57) ABSTRACT

A structure for shielding a rail exposed to an outside of a sliding door vehicle includes a rail configured to be mounted in a vehicle, a drive unit movably connected to the rail, and a cover unit having one side connected to the drive unit and configured to be foldable and unfoldable. The cover unit is configured to move to open or close a space in which the rail is positioned.

20 Claims, 12 Drawing Sheets

STRUCTURE FOR SHIELDING RAIL EXPOSED TO OUTSIDE OF SLIDING DOOR VEHICLE

CROSS-REFERENCE TO RELATED APPLICATIONS

This application claims the benefit of Korean Patent Application No. 10-2020-0085414, filed on Jul. 10, 2020, in the Korean Intellectual Property Office, which application is hereby incorporated herein by reference.

TECHNICAL FIELD

The present invention relates to a structure for shielding a rail exposed to the outside of a sliding door vehicle.

BACKGROUND

In general, a vehicle has an occupant compartment having a predetermined size in which a driver or an accompanied occupant may be seated, and occupant compartment opening/closing doors are installed on a vehicle body to open or close the occupant compartment.

Sliding type occupant compartment opening/closing doors include a front sliding door installed at a front side in a longitudinal direction of a vehicle and a rear sliding door installed at a rear side in the longitudinal direction of the vehicle. The front sliding door and the rear sliding door are typically installed to be moved along rails mounted on a vehicle body or the doors.

As illustrated in FIG. 1A, referring to a structure of a vehicle equipped with sliding doors, a lower rail 20 is provided in a longitudinal direction of a vehicle body, a drive unit 30 is movably connected to the lower rail 20, and a lower arm 4o is rotatably connected to the drive unit 30 and a door 10. Therefore, when external force is applied to the door 10, the drive unit 30 moves along the lower rail 20, thereby operating the door 10.

Meanwhile, side sills 50 are mounted at both sides of a lower portion of the vehicle body. The side sill 50 defines a closed cross section while including an inner side sill panel, an outer side sill panel, a reinforcing material, and the like. As illustrated in FIGS. 1B and 1C, an internal space 60 of the side sill 50 is opened when the door 10 is opened. For this reason, there may be a problem in that foreign substances enter from the outside.

In order to solve the problem, Korean Utility Model Application Laid-Open No. 97-21619 (Structure for Preventing Foreign Substance from Entering Side Sill for Vehicle) discloses that a dust inflow prevention member fastened to a lower end of a door prevents foreign substances such as dust from entering a space portion formed in an upper portion of an outer panel that defines a side sill.

However, Korean Utility Model Application Laid-Open No. 97-21619 discloses a structure which is applied to a swing type opening/closing door among the opening/closing doors for a vehicle in the related art but cannot be applied to the vehicle equipped with the sliding doors.

SUMMARY

The present invention relates to a structure for shielding a rail exposed to the outside of a sliding door vehicle. Particular embodiments relate to a structure for shielding a rail, which closes an internal side sill space, in which the rail is mounted, in accordance with a movement of a sliding door, thereby preventing foreign substances from entering a side sill.

Embodiments of the present invention provide a new type of structure capable of preventing foreign substances from entering an internal side sill space for a sliding door vehicle.

Embodiments of the present invention include a rail mounted in a vehicle, a drive unit movably connected to the rail, and a cover unit having one side connected to the drive unit and configured to be foldable and unfoldable. In this case, the cover unit moves to open or close a space in which the rail is positioned.

The rail is mounted in an internal space of a side sill.

The structure may include a guide rail unit configured to guide an unfolding operation and a folding operation of the cover unit.

A guide path may be formed in the guide rail unit, and the cover unit may roll along the guide path.

A carrier, which assists the folding operation or the unfolding operation of the cover unit in accordance with the movement of the drive unit, may be rotatably connected to the drive unit and the cover unit.

The cover unit may include covers connected at both sides by means of a coupler.

The covers may be rotatably connected at both sides of the coupler in a width direction.

Two connecting portions may be rotatably connected to the coupler, and the cover may be fixedly connected to each of the connecting portions.

The coupler may have a spring that applies elastic force when the cover is unfolded or folded.

The guide rail unit may include a first guide rail elongated in a direction of the rail, and a second guide rail branching off from the first guide rail such that the second guide rail is disposed to be spaced apart from the first guide rail.

A branch groove may be formed at a branch point at which the first guide rail and the second guide rail are connected to each other.

The second guide rail may include an inclined portion branching off from the first guide rail and formed to be inclined at a predetermined angle and a parallel portion extending from the inclined portion and disposed in parallel with the first guide rail.

A first roller may be connected to a first coupler positioned at one side of the cover so that the first roller is not inserted into the branch groove, and a second roller may be connected to a second coupler positioned at the other side of the cover so that the second roller is inserted into the branch groove.

According to embodiments of the present invention, the internal side sill space may be always closed while the door moves, thereby preventing external foreign substances from entering the internal side sill space.

According to embodiments of the present invention, the structure of the cover unit includes the cover and the coupler, such that when some components of the cover unit are damaged, only the damaged components may be replaced without having to replace the entire cover unit, thereby simplifying the repair process.

DETAILED DESCRIPTION OF ILLUSTRATIVE EMBODIMENTS

Hereinafter, exemplary embodiments of a structure for shielding a rail exposed to the outside of a sliding door vehicle according to the present invention will be described in detail with reference to the drawings. Terms or words used herein should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Figure 1A:
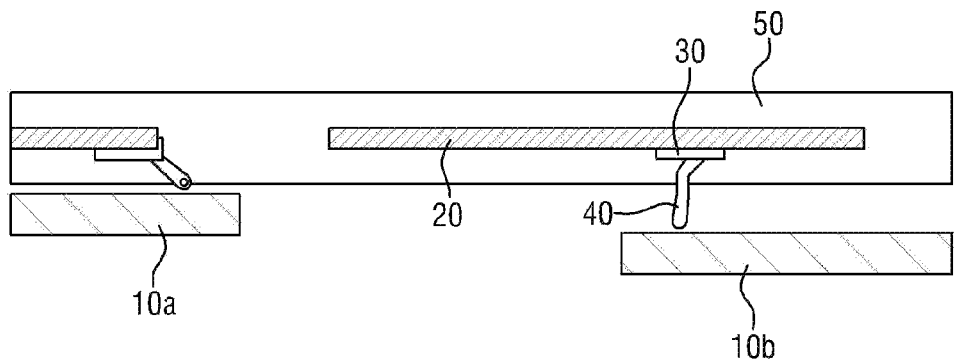
FIG. 1A is a view illustrating a state in which opposite sliding doors are operated.
Figure 1B:
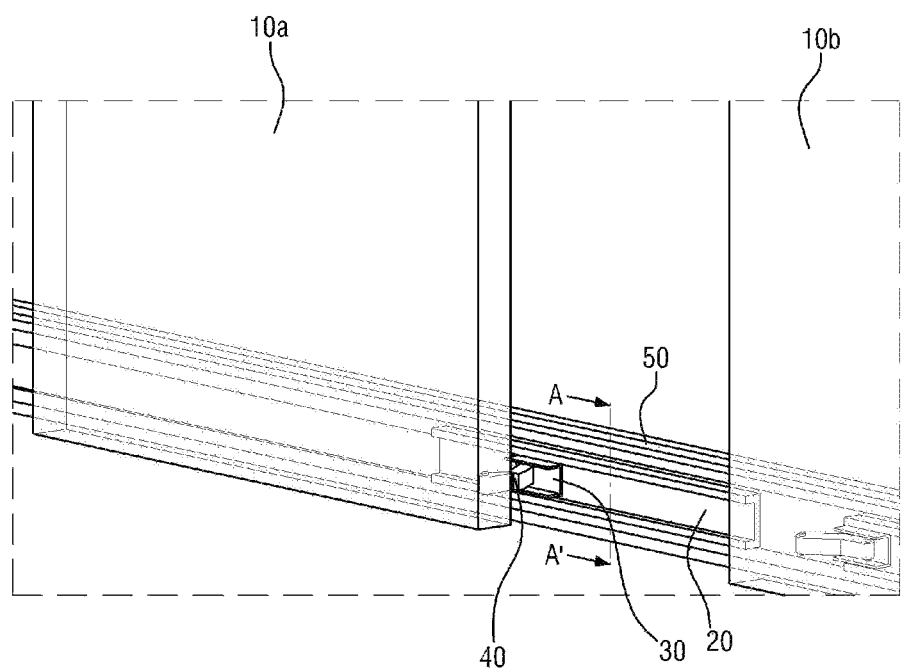
FIG. 1B is a view illustrating a state in which an internal side sill space is opened when the door is opened.
Figure 1C:
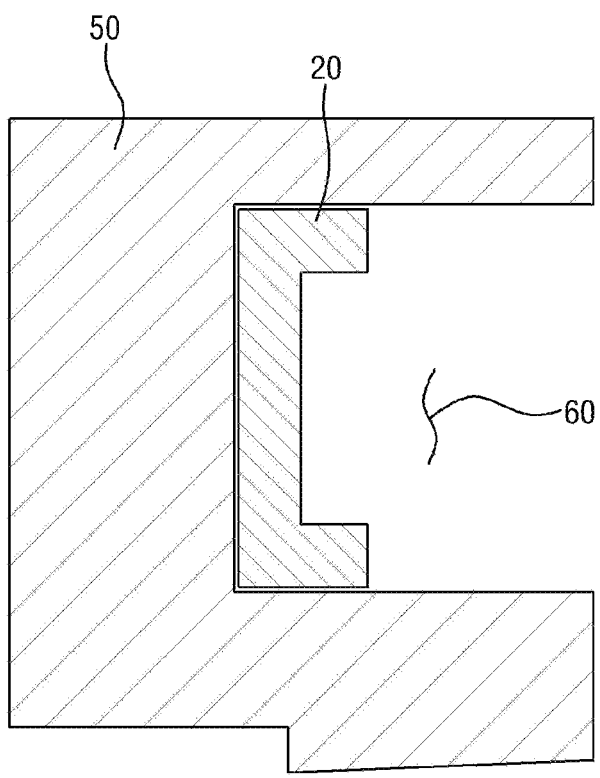
FIG. 1C is a cross-sectional view taken along line A-A' in FIG. 1B.
Figure 2:
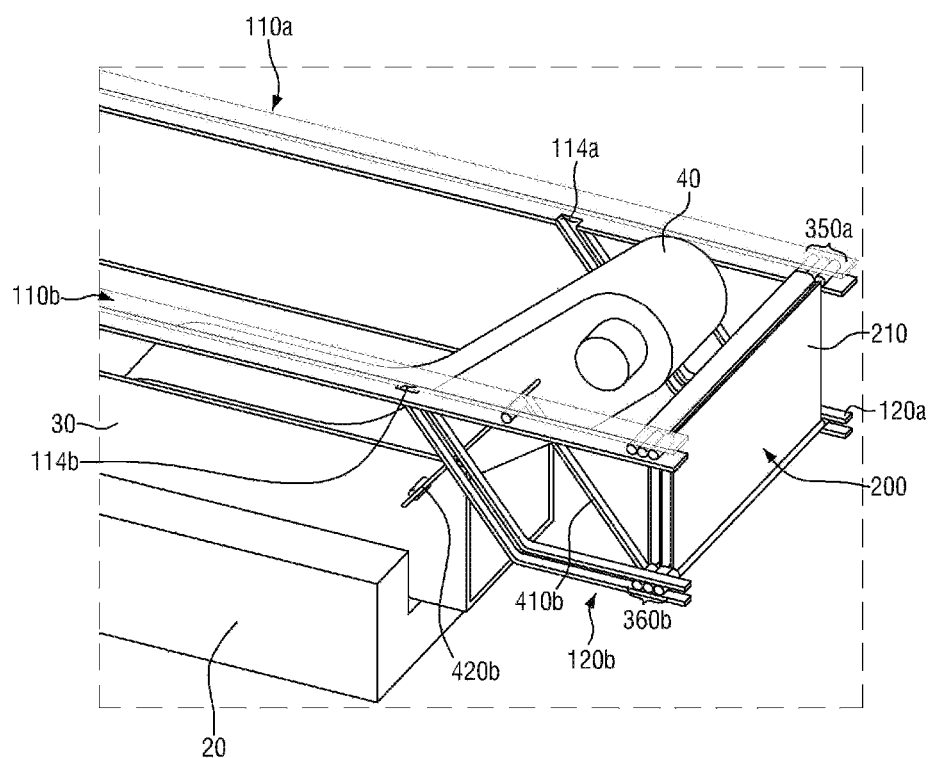
FIG. 2 is a view illustrating a structure for shielding a rail exposed to the outside of a sliding door vehicle according to an exemplary embodiment of the present invention.

FIG. 2 is a view illustrating a structure for shielding a rail exposed to the outside of a sliding door vehicle according to an exemplary embodiment of the present invention.

Referring to FIG. 2, the structure for shielding a rail exposed to the outside of a sliding door vehicle according to an exemplary embodiment of the present invention includes a lower rail 20, a drive unit 30, a guide rail unit including guide rails 110a, 110b, 120a and 120b, and a cover unit 200.

In an internal space 60 of the side sill 50 formed in a sliding door vehicle, the lower rail 20 is mounted in a longitudinal direction of a vehicle body. The drive unit 30 is movably connected to the lower rail 20. In this case, the drive unit 30 may have a roller (not illustrated), and the roller (not illustrated) may be rollably connected to the lower rail 20. One end of a lower arm 40 is rotatably connected to the drive unit 30, and the other end of the lower arm 40 is rotatably connected to a door 10. Therefore, when external force is applied to the door 10 in one direction, the drive unit 30 may move along the lower rail 20.

Meanwhile, the structures for shielding a side sill, which are applied to a front door boa and a rear door 10b, are identical in configuration to each other except that the structures for shielding a side sill have the directions opposite to each other. Therefore, in the present specification, the description will be made focusing on any one door 10.

Figure 3:
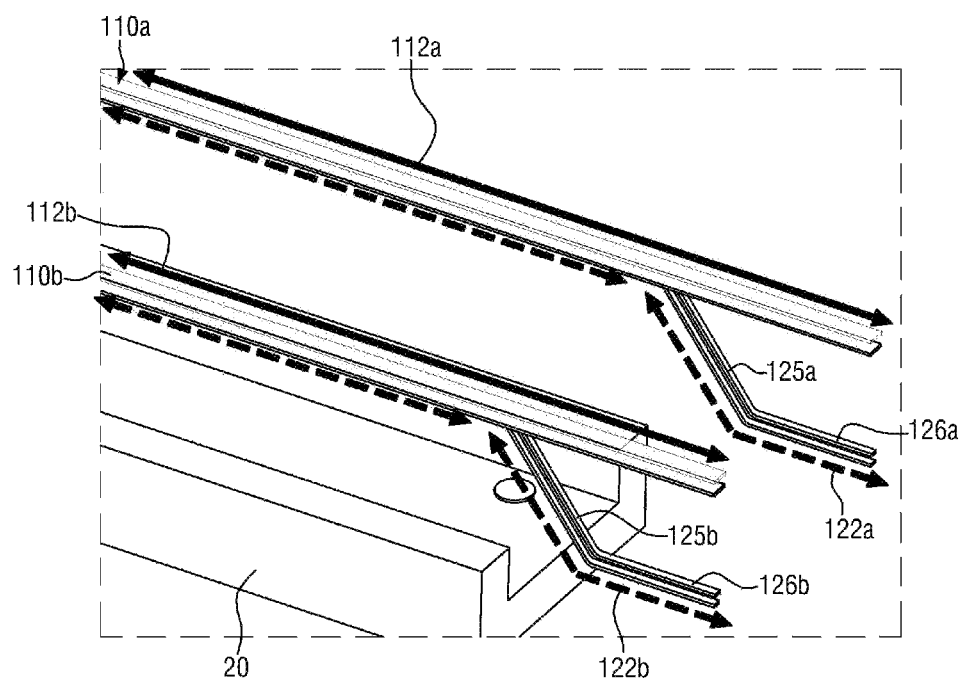
FIG. 3 is a view illustrating a guide path of a guide rail unit according to an exemplary embodiment of the present invention.

FIG. 3 is a view illustrating a guide path of a guide rail unit according to an exemplary embodiment of the present invention. Meanwhile, for convenience of description, FIG. 3 illustrates only the lower rail 20 and the guide rail unit including first and second guide rails 110a, 110b, 120a and 120b.

The guide rail unit serves to guide the movement of the cover unit 200 and includes first guide rails 110a and 110b and second guide rails 120a and 120b.

The two first guide rails 110a and 110b are positioned at both sides of the cover unit 200 so as to face each other and are elongated in a longitudinal direction of the lower rail 20. The first guide rails 110a and 110b each have two rails spaced apart from each other, and first guide paths 112a and 112b are formed between the two rails. The first guide rails 110a and 110b have branch grooves 114a and 114b through which the second guide rails 120a and 120b to be described below branch off from the first guide rails 110a and 110b.

The two second guide rails 120a and 120b are connected to the branch grooves 114a and 114b and are positioned at both sides of the cover unit 200 so as to face each other. The second guide rails 120a and 120b include inclined portions 125a and 125b and parallel portions 126a and 126b. The inclined portions 125a and 125b, are formed to be inclined at a predetermined angle toward the lower rail 20 from the branch grooves 114a and 114b. The parallel portions 126a and 126b extend from the inclined portions 125a and 125b, and are formed in parallel with the first guide rails 110a and 110b. The second guide rails 120a and 120b each have two rails spaced apart from each other, and second guide paths 122a and 122b are partially formed between the two rails.

Referring to FIG. 3, the first guide paths 112a and 112b are indicated by solid lines and illustrated above the first guide rails 110a and 110b for convenience of description. The second guide paths 122a and 122b are indicated by dotted lines and illustrated below the first and second guide rails 110a, 110b, 120a and 120b for convenience of description.

Figure 4:
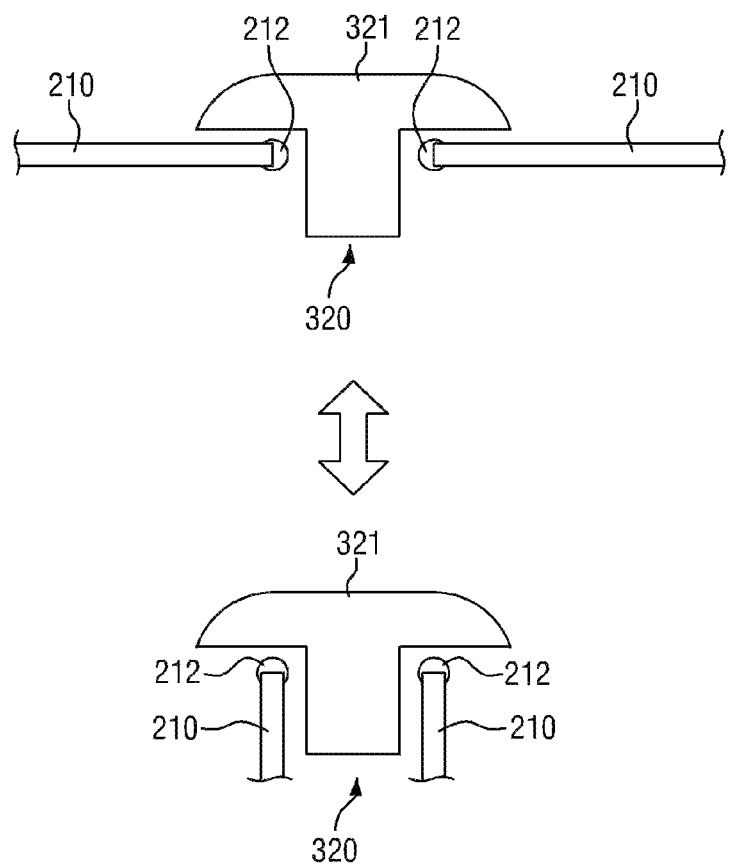
FIG. 4 is a view illustrating a cross section of a coupler in a width direction according to an exemplary embodiment of the present invention.

FIG. 4 is a view illustrating a cross section of a coupler in a width direction according to an exemplary embodiment of the present invention.

The cover unit 200 includes a plurality of covers 210 and a plurality of couplers 320 so as to be folded or unfolded. The coupler 320 connects the covers 210 positioned at both sides. As illustrated in FIG. 4, the coupler 320 according to an exemplary embodiment of the present invention includes a main body 321 having an approximately 'T' shape. However, the shape of the main body 321 is not limited. Rotary pins 212 are fixedly connected to spaces at both sides of the main body 321, and the covers 210 are connected to the rotary pins 212. In the spaces at both sides of the main body 321, the covers 210 may be rotated about the rotary pins 212 by approximately 90 degrees. The cover unit 200 illustrated at the top side in FIG. 4 has the unfolded covers 210, and the cover unit 200 illustrated at the bottom side in FIG. 4 has the folded cover 210.

Figure 5:
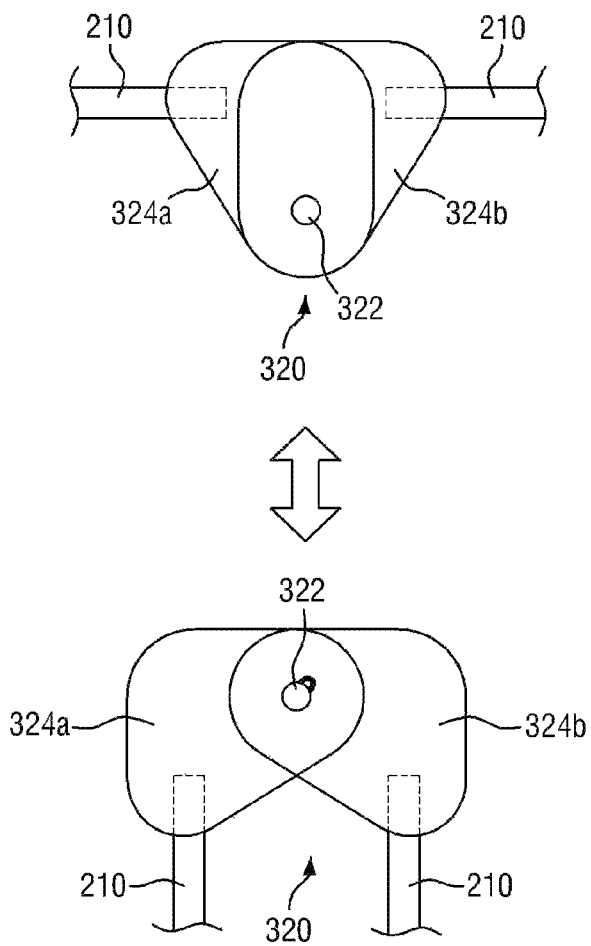
FIG. 5 is a view illustrating a cross section of a coupler in a width direction according to another exemplary embodiment of the present invention.

FIG. 5 is a view illustrating a cross section of a coupler in a width direction according to another exemplary embodiment of the present invention.

As illustrated in FIG. 5, the coupler 320 according to another exemplary embodiment of the present invention has a configuration in which a first connecting portion 324a and a second connecting portion 324b are connected to each other by a central rotary pin 322. The covers 210 are fixedly connected to the first connecting portion 324a and the second connecting portion 324b, respectively. The first connecting portion 324a and the second connecting portion 324b may rotate about the central rotary pin 322 by approximately 90 degrees and then interfere with each other. The cover unit 200 illustrated at the top side in FIG. 5 has the unfolded covers 210, and the cover unit 200 illustrated at the bottom side in FIG. 5 has the folded cover 210.

A spring (not illustrated) may be provided on the rotary pin 212 or the central rotary pin 322. The spring (not illustrated) applies elastic force so that the covers 210 are smoothly unfolded or folded. A direction in which the elastic force is applied to the cover 210 is not limited. In an exemplary embodiment of the present invention, the spring (not illustrated) is provided so that the elastic force is applied when unfolding the covers 210 and the elastic force is eliminated when folding the covers 210.

Figure 6A:
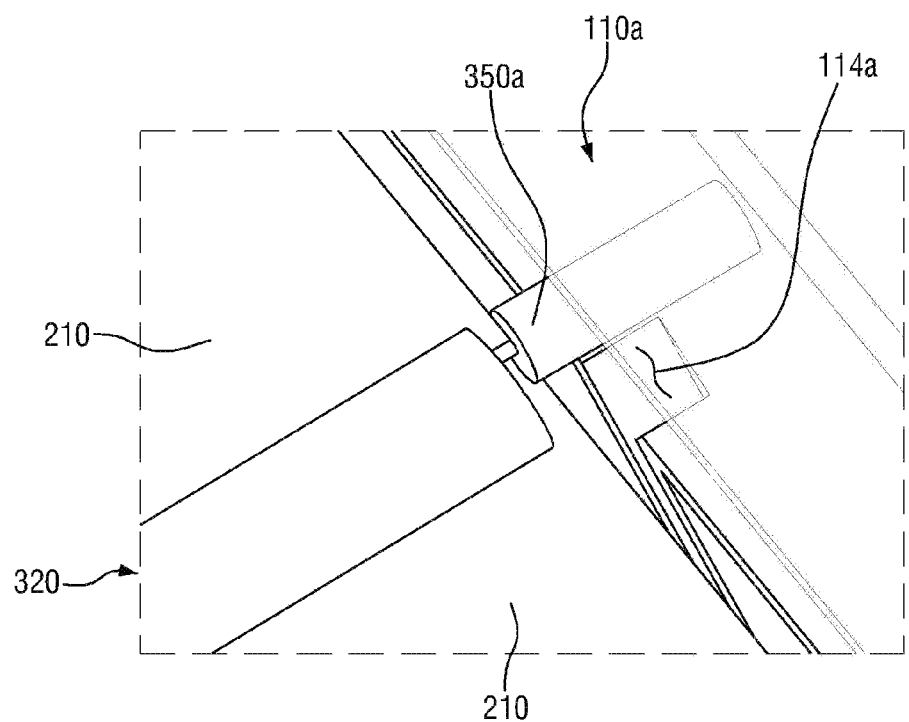
FIG. 6A is a view illustrating a first roller according to an exemplary embodiment of the present invention.
Figure 6B:
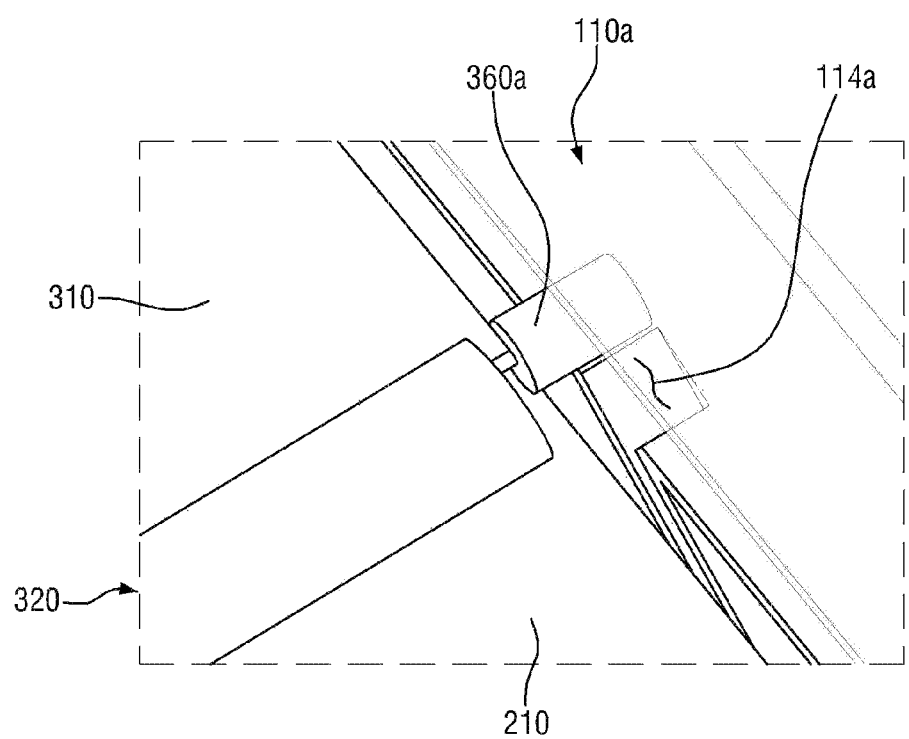
FIG. 6B is a view illustrating a second roller according to an exemplary embodiment of the present invention.

FIG. 6A is a view illustrating a first roller according to an exemplary embodiment of the present invention, and FIG. 6B is a second roller according to an exemplary embodiment of the present invention.

Rollers, including first rollers 350a and 350b and second rollers 360a and 360b, are connected to both sides of the coupler 320 in the longitudinal direction, and the rollers may move along the guide paths 112a, 112b, 122a, and 122b. According to an exemplary embodiment of the present invention, the two pairs of rollers are connected at both sides of the coupler 320. However, there is no limitation on positions at which the rollers are connected to the coupler 320, and there is no limitation on number of rollers.

As illustrated in FIG. 6A, the first rollers 350a and 350b each have a length that prevents the first rollers 350a and 350b from being inserted into the branch grooves 114a and 114b. Therefore, movement paths through which the first rollers 350a and 350b move along the first guide rails 110a and 110b are the first guide paths 112a and 112b (see FIG. 3). As illustrated in FIG. 6B, the second rollers 360a and 360b each have a smaller length than the first rollers 350a and 350b, such that the second rollers 360a and 360b may be inserted into the branch grooves 114a and 114b. Therefore, movement paths through which the second rollers 360a and 360b move along the second guide rails 120a and 120b are the second guide path 122a and 122b (see FIG. 3).

Meanwhile, a criterion for distinguishing between the first rollers 350a and 350b and the second rollers 360a and 360b is whether the first rollers 350a and 350b and the second rollers 360a and 360b may be inserted into the branch grooves 114a and 1114b. Therefore, in another exemplary embodiment of the present invention, the first rollers 350a and 350b may have sizes or shapes that cannot be inserted into the branch grooves 114a and 114b, and the second rollers 360a and 360b may have sizes or shapes that may be inserted into the branch grooves 114a and 114b.

Based on the one cover 210, the first rollers 350a and 350b are connected to the coupler 320 positioned at one side of the cover 210, and the second rollers 360a and 360b are connected to the coupler 320 positioned at the other side of the cover 210. That is, the first rollers 350a and 350b and the second rollers 360a and 360b are alternately connected to the respective couplers 320. Therefore, one side of the cover 210, at which the first rollers 350a and 350b are positioned, may move along the first guide paths 112a and 112b in one direction (a downward direction based on FIG. 4), and the other side of the cover 210, at which the second rollers 360a and 360b are positioned, may move along the second guide paths 122a and 122b. In this case, the cover unit 200 is folded when one side of the cover 210 moves in one direction along the second guide paths 122a and 122b, and the cover unit 200 is unfolded when one side of the cover 210 moves in the other direction along the second guide paths 122a and 122b.

The foremost cover 210a, which is positioned closest to the lower arm 40 among the covers 210 (the cover positioned at the leftmost side based on FIGS. 7A to 7C), does not require the coupler 320 at one side thereof because there is no cover 210 adjacent to one side of the foremost cover 210a. In addition, the rearmost cover 210C, which is positioned farthest from the lower arm 40 among the covers 210 (the cover positioned at the rightmost side based on FIGS. 7A to 7C), does not require the coupler 320 at the other side thereof because there is no cover 210 adjacent to the other side of the rearmost cover 210C. In this case, the foremost and rearmost sides are determined based on the direction in which the covers 210 are unfolded. However, the rollers are connected to one side of the foremost cover 210a and the other side of the rearmost cover 210C and the rollers may move along the first guide paths 112a and 112b.

Connecting rollers 370a and 370b are provided in front of the foremost cover 210a so as to be movable along the first guide paths 112a and 112b. The connecting rollers 370a and 370b have the same length or size as the second rollers 360a and 360b, such that the connecting rollers 370a and 370b cannot be inserted into the branch grooves 114a and 114b. First carriers 410a and 410b are rotatably connected to the connecting rollers 370a and 370b and the rollers positioned at one side of the foremost cover 210a. Further, second carriers 420a and 420b are rotatably connected to the connecting rollers 370a and 370b and the drive unit 30. Therefore, when the drive unit 30 moves, the connecting rollers 370a and 370b move along the first guide paths 112a and 112b by means of the second carriers 420a and 420b, and the foremost cover 210a, which is connected to the connecting rollers 370a and 370b through the first carriers 410a and 410b, moves along the guide paths 112a, 112b, 122a, and 122b.

Figure 7A:
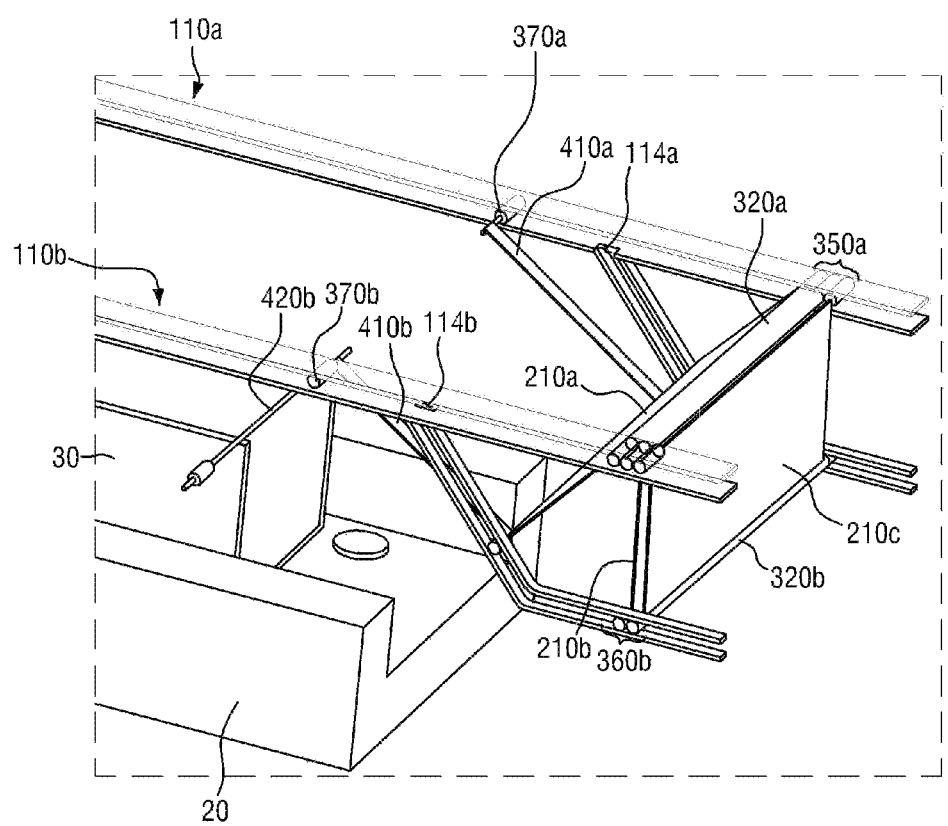
FIGS. 7A to 7C are views illustrating a process in which a cover unit is changed from a folded state to an unfolded state while moving along the guide rail unit.
Figure 7B:
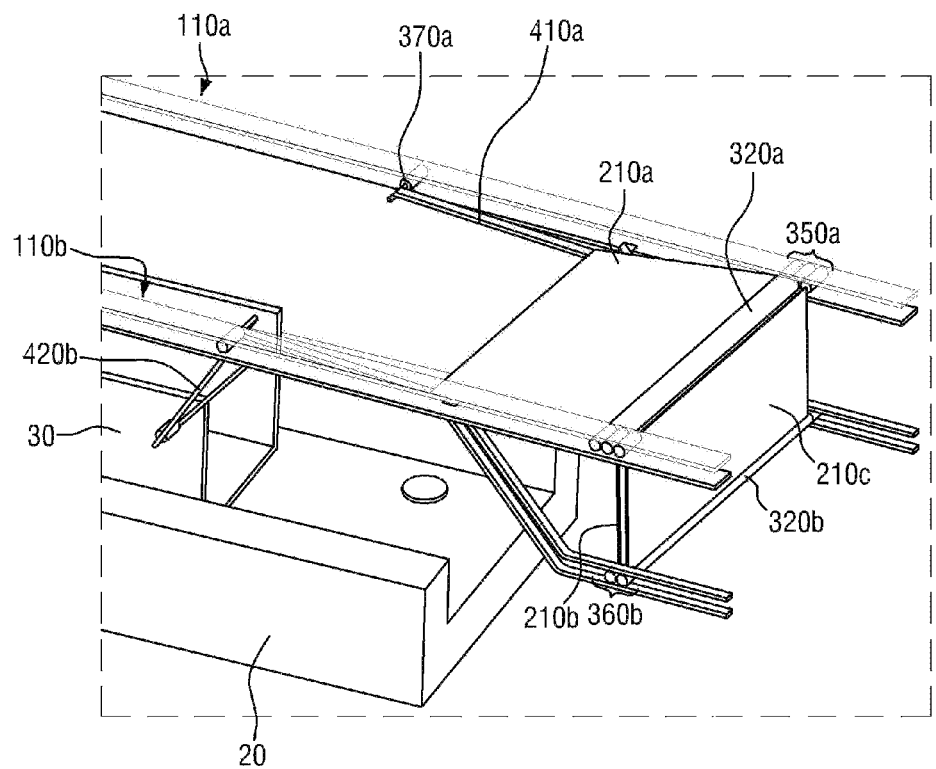
Figure 7C:
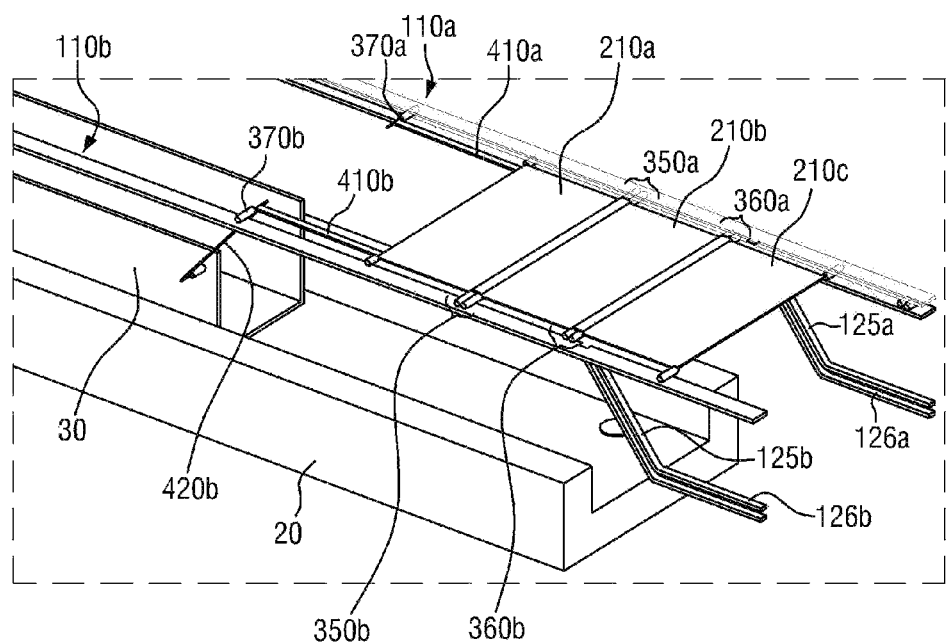

FIGS. 7A to 7C are views illustrating a process in which the cover unit is changed from a folded state to an unfolded state while moving along the guide rail unit.

Hereinafter, a process of operating the structure for shielding a rail exposed to the outside of a sliding door vehicle according to an exemplary embodiment of the present invention will be described with reference to FIGS. 7A to 7C. Meanwhile, FIGS. 7A to 7C illustrate only a part of the cover 210 and a part of the coupler 320 for convenience of description.

As illustrated in FIG. 7A, when the drive unit 30 moves in one direction (a left direction based on FIG. 7A) when the cover unit 200 is in the folded state, the second rollers 360a and 360b on the foremost cover 210a move from the parallel portions 126a and 126b to the inclined portions 125a and 125b, such that the foremost cover 210a is unfolded. In this case, the intermediate cover 210b and the rearmost cover 210C are in the folded state, such that the first rollers 350a and 350b on the cover 210 are positioned on the first guide rails 110a and 110b, and the second rollers 360a and 360b are positioned on the parallel portions 126a and 126b.

As illustrated in FIG. 7B, when the drive unit 30 further moves in one direction from the state illustrated in FIG. 7A, the second rollers 360a and 360b on the foremost cover 210a move to the branch grooves 114a and 114b along the inclined portions 125a and 125b, such that the extent to which the foremost cover 210a is unfolded is increased.

Thereafter, when the drive unit 30 further moves in one direction, the second rollers 360a and 360b on the foremost cover 210a are moved out of the branch grooves 114a and 114b, such that the foremost cover 210a is fully unfolded. In this case, when the drive unit 30 still moves in one direction, the foremost cover 210a moves in one direction by means of the second rollers 360a and 360b positioned on the first guide rails 110a and 110b.

Thereafter, the second rollers 360a and 360b on the intermediate cover 210b connected to the first coupler 320a move from the parallel portions 126a and 126b to the inclined portions 125a and 125b, such that the intermediate cover 210b is unfolded. The process after the intermediate cover 210b is unfolded is the same as the process in which the foremost cover 210a operates.

Thereafter, as illustrated in FIG. 7C, the operation of unfolding the cover unit 200 is completed when the rearmost cover 210C is fully unfolded.

Meanwhile, the process of operating the cover unit 200 from the unfolded state to the folded state is performed by reversely performing the above-mentioned process.

FIGS. 7A to 7C illustrate only the single intermediate cover 210b, but the plurality of intermediate covers 210b may be provided to cover the internal space 6o of the side sill 50.

Figure 8:
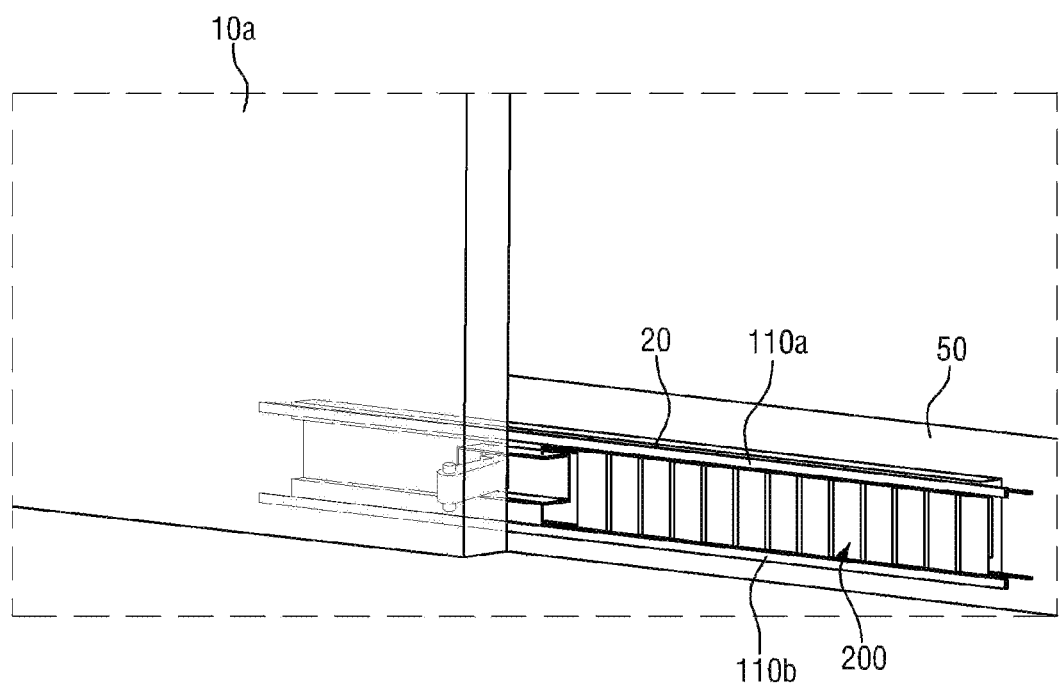
FIG. 8 is a view illustrating a state in which the structure for shielding a rail exposed to the outside of a sliding door vehicle according to an exemplary embodiment of the present invention shields a side sill.

FIG. 8 is a view illustrating a state in which the structure for shielding a rail exposed to the outside of a sliding door vehicle according to an exemplary embodiment of the present invention shields a side sill.

As illustrated in FIG. 8, the cover unit 200 may shield the internal space 6o of the side sill 50 by being moved by the drive unit 30, thereby preventing foreign substances from entering the side sill 50 when the door 10 is opened.

It is easy to repair the cover unit 200 because only the broken-down component, among the covers 210 and the couplers 320 that constitute the cover unit 200, may be replaced.

Meanwhile, FIG. 8 illustrates the configuration in which the single structure for shielding a rail exposed to the outside of a sliding door vehicle is applied, but the present invention may also be applied to a vehicle equipped with opposite sliding doors. In this case, the shielding structures applied to the opposite sliding doors have the same configuration but are disposed in opposite directions.

The present invention has been described with reference to the limited exemplary embodiments and the drawings, but the present invention is not limited thereto. The described exemplary embodiments may be variously changed or modified by those skilled in the art to which the present invention pertains within the technical spirit of the present invention and within the scope equivalent to the appended claims.

What is claimed is:

1. A structure for shielding a rail exposed to an outside of a sliding door vehicle, the structure comprising:
a rail configured to be mounted in a vehicle;
a drive unit movably connected to the rail; and
a cover unit having one side connected to the drive unit and configured to be foldable and unfoldable, wherein the cover unit is configured to move to open or close a space in which the rail is positioned.

2. The structure of claim 1, wherein the rail is configured to be mounted in an internal space of a side sill.

3. The structure of claim 1, further comprising a guide rail unit configured to guide an unfolding operation and a folding operation of the cover unit.

4. The structure of claim 3, wherein a guide path is formed in the guide rail unit and the cover unit is configured to roll along the guide path.

5. The structure of claim 3, further comprising a carrier rotatably connected to the drive unit and the cover unit, wherein the carrier is configured to assist the folding operation or the unfolding operation of the cover unit in accordance with a movement of the drive unit.

6. The structure of claim 1, wherein the cover unit comprises covers connected at both sides by a coupler.

7. The structure of claim 6, wherein the covers are rotatably connected at both sides of the coupler in a width direction.

8. The structure of claim 6, wherein two connecting portions are rotatably connected to the coupler and the covers are fixedly connected to the connecting portions.

9. The structure of claim 6, wherein the coupler comprises a spring configured to apply elastic force when the cover unit is unfolded or folded.

10. A structure for shielding a rail exposed to an outside of a sliding door vehicle, the structure comprising:
a rail configured to be mounted in a vehicle;
a drive unit movably connected to the rail;
a cover unit having one side connected to the drive unit and configured to be foldable and unfoldable, wherein the cover unit is configured to move to open or close a space in which the rail is positioned; and
a guide rail unit configured to guide an unfolding operation and a folding operation of the cover unit, wherein the guide rail unit comprises:
a first guide rail elongated in a direction of the rail; and
a second guide rail branching off from the first guide rail such that the second guide rail is disposed to be spaced apart from the first guide rail.

11. The structure of claim 10, wherein a branch groove is formed at a branch point at which the first guide rail and the second guide rail are connected to each other.

12. The structure of claim 11, further comprising:
a first roller connected to a first coupler positioned at a first side of the cover unit so that the first roller is not inserted into the branch groove; and
a second roller connected to a second coupler positioned at a second side of the cover unit so that the second roller is inserted into the branch groove.

13. The structure of claim 10, wherein the second guide rail comprises:
an inclined portion branching off from the first guide rail and formed to be inclined at a predetermined angle; and
a parallel portion extending from the inclined portion and disposed in parallel with the first guide rail.

14. A vehicle comprising:
a vehicle body;
a sliding door connected to the vehicle body;
a rail mounted in the vehicle body;
a drive unit movably connected to the rail; and
a cover unit having one side connected to the drive unit and configured to be foldable and unfoldable, wherein the cover unit is configured to move to open or close a space in which the rail is positioned.

15. The vehicle of claim 14, wherein the rail is mounted in an internal space of a side sill.

16. The vehicle of claim 14, further comprising a guide rail unit configured to guide an unfolding operation and a folding operation of the cover unit.

17. The vehicle of claim 16, wherein a guide path is formed in the guide rail unit and the cover unit is configured to roll along the guide path.

18. The vehicle of claim 16, further comprising a carrier rotatably connected to the drive unit and the cover unit, wherein the carrier is configured to assist the folding operation or the unfolding operation of the cover unit in accordance with a movement of the drive unit.

19. The vehicle of claim 14, wherein:
the cover unit comprises covers connected at both sides by a coupler;
the covers are rotatably connected at both sides of the coupler in a width direction; and two connecting portions are rotatably connected to the coupler, and the cover unit is fixedly connected to each of the two connecting portions.

20. The vehicle of claim 14, wherein:

the cover unit comprises covers connected at both sides by a coupler; and the coupler comprises a spring configured to apply elastic force when the cover unit is unfolded or folded.

* * * * *